W. A. LOOMIS.
AUTOMATIC SPEED CONTROLLER.
APPLICATION FILED NOV. 24, 1908.
940,979.
Patented Nov. 23, 1909.
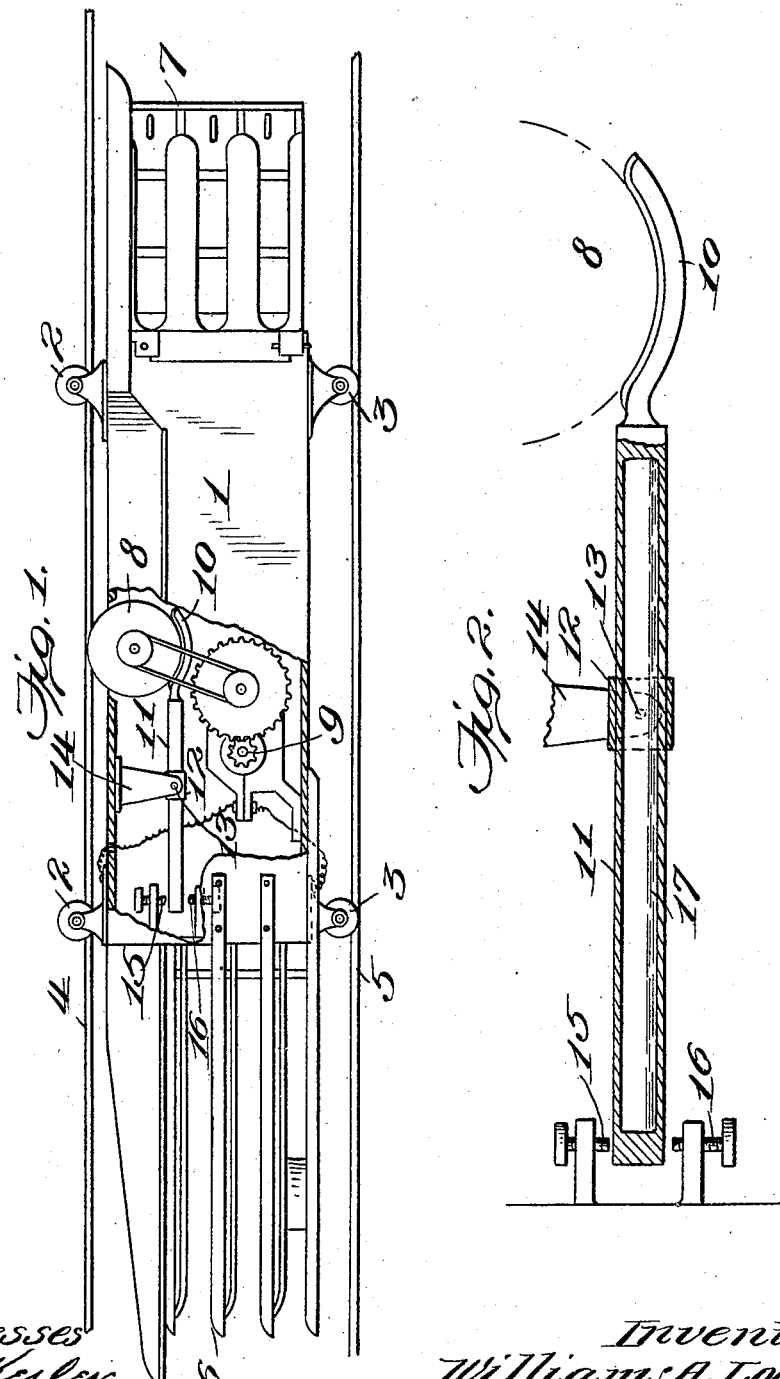

UNITED STATES PATENT OFFICE.

WILLIAM ARTHUR LOOMIS, OF ILION, NEW YORK.

AUTOMATIC SPEED-CONTROLLER.

940,979. Specification of Letters Patent. Patented Nov. 23, 1909.

Original application filed May 21, 1908, Serial No. 434,177. Divided and this application filed November 24, 1908. Serial No. 464,300.

*To all whom it may concern:*

Be it known that I, WILLIAM ARTHUR LOOMIS, a citizen of the United States, residing at Ilion, in the county of Herkimer and State of New York, have invented new and useful Improvements in Automatic Speed-Controllers, of which the following is a specification.

My present invention relates to improvements in speed regulators or controllers for cars, vehicles and other moving bodies, and it has for its object primarily to provide a controller or regulator of this character that is capable of automatically governing the speed of movement of a vehicle, car or other device in order that the velocity of the same may be substantially uniform, irrespective of whether the car or other vehicle is traveling on a level or is ascending or descending a grade, the controller operating in the present instance as a brake which is set automatically by the tilting or inclination of the car as the latter is descending a grade, and said brake is automatically released when the car or vehicle resumes a level position or a position wherein the forward end of the vehicle is inclined upwardly as when the car or vehicle is ascending a grade.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a side elevation of a car in the form of a traveling carrier equipped with a speed regulator or controller constructed in accordance with my present invention; and Fig. 2 is a detail sectional view of the controller.

Similar parts are designated by the same reference characters in the several views.

Speed regulators or controllers constructed in accordance with my present invention are capable of use generally upon cars, vehicles or other moving bodies wherein it is desirable or necessary to so control them as to insure substantial uniformity in their speed or to prevent excessive speed of such vehicles in descending a grade.

In the present instance, I have shown the invention applied to a traveling carrier which is adapted for use upon mail collecting and delivering systems of the character set forth in my co-pending application, Serial No. 434,177 filed May 21, 1908 of which application the present is a division. It will therefore be necessary to describe such carrier in a general way only, the carrier comprising a body 1 having pairs of upper and lower supporting wheels or rollers 2 and 3, respectively, which travel upon the upper and lower trolley wires 4 and 5, a receiving magazine 6 being arranged at the forward end of the carrier and a distributing magazine 7 is mounted at the rear end of the carrier. A driving wheel 8 is mounted upon the carrier and is preferably arranged at a position intermediate between the upper supporting rollers 2 and is adapted to have frictional engagement with the under side of the trolley wire 4 whereby the traction of this wheel will be practically constant. This driving wheel is operatively connected to an appropriate motor 9, an electric motor being shown in the present instance which receives its current from the upper and lower trolley wires.

The speed controller comprises a brake shoe 10 which is arranged to coöperate with the periphery of the wheel 8, or, it may coöperate with a separate brake wheel which may be mounted to revolve with the driving wheel whereby the motion of the car may be controlled. This brake shoe is attached to one end of a tube 11, the latter having a sleeve 12 fitted thereto at an intermediate point and provided with trunnions 13 which coöperate with the arms of a suitable bracket 14, the latter being fixed to a part of the carrier. By so mounting the tube, it is capable of a tilting or rocking movement in a vertical plane, and this rocking movement of the tube is limited by a pair of upper and lower stops 15 and 16, these stops in the present instance being arranged at that end of the tube opposite to the end carrying the brake shoe and are adapted to coöperate with the upper and lower sides of the tube. Both of the stops are preferably adjustable, set screws being shown in the present instance, and the stop 15 is so adjusted that when the tube is rocked to release the brake shoe, the latter will be permitted to move a sufficient distance from the brake wheel as to relieve the braking action thereon. The rocking movements of the tube to set and release the brake shoe are effected in the present instance by means of a body of mercury 17 which is contained within the tube, and normally the weight of the brake shoe 10 is sufficient to retain the tube in such a position that it will rest against the stop 15, the mercury then occupying a position in that end of the tube to which the brake shoe is attached and the latter will therefore be held in an inoperative position. The tube remains in this position while the vehicle or car is traveling either on a level or is ascending an incline. When the carrier or car is descending an incline, however, the inclination of the car will cause a corresponding inclination of the tube, the mercury therein being thus caused to flow toward the forward end of the tube, unbalancing the latter and causing the brake shoe to bear upon the brake wheel, the movement of the car or vehicle being thereby retarded. As soon as the car or vehicle resumes a horizontal position, the mercury will again flow toward that end of the tube to which the brake shoe is attached and the latter will be thereby held free from the brake wheel so that the vehicle may move at the requisite speed.

A speed controller constructed in accordance with my present invention is comparatively simple and inexpensive in its construction, and in practice, it is capable of operating with certainty to regulate or control the speed of movement of the carrier or vehicle, the operation of the regulator or controller being governed according to the inclination of the carrier or the track upon which the same travels.

It will be understood, of course, that while I have illustrated the controller in connection with a carrier such as that embodied in the mail collecting and distributing system covered by my prior application aforesaid, the invention is not necessarily limited to a carrier or vehicle of that particular type, as I contemplate using it generally in those cases wherein it is desirable or necessary to maintain a practically uniform speed of a car or vehicle, irrespective of grades.

I claim as my invention:—

1. An automatic speed controller for vehicles comprising a brake operable to retard the movement of the vehicle, and a device governed in its movements automatically and according to the inclination of the vehicle and having means for transferring its movements directly to the brake for controlling the operation of the brake.

2. An automatic speed controller for vehicles comprising a brake wheel, a brake shoe, and means operable automatically according to the inclination of the vehicle and connected positively to said brake shoe for setting and releasing the brake shoe relatively to the brake wheel.

3. An automatic speed controller for vehicles comprising a tube pivoted to swing in a vertical plane on the vehicle, a body contained within and adapted to move toward either end of said tube according to the inclination of the carrier for causing a tilting movement of the tube, and means operable automatically by the swinging movements of said tube for retarding the movement of the vehicle.

4. An automatic speed controller for vehicles comprising a brake wheel, a tube pivoted to swing in a vertical plane on the vehicle and having a brake shoe attached thereto and adapted to coöperate with said brake wheel, and a body contained within and adapted to move longitudinally of said tube according to the inclination of the carrier for controlling the setting and releasing of the brake shoe.

5. An automatic speed controller for vehicles comprising a brake wheel, a tube pivoted to move in a vertical plane on the vehicle and provided with a brake shoe, and a body of mercury contained in said tube and adapted to occupy a position at either end thereof according to the inclination of the carrier for controlling the setting and releasing of the brake shoe.

6. An automatic speed controller for vehicles comprising a tube adapted to be pivoted for swinging movement in a vertical plane on the vehicle, a body contained in said tube and adapted to move toward either end thereof according to the inclination of movements of said tube for controlling the speed of the vehicle, and an adjustable stop for normally holding said tube in an inoperative position.

In testimony whereof I have hereunto set my hand in presence of two subscribing witnesses.

WILLIAM ARTHUR LOOMIS.

Witnesses:
ROY C. DEVENDORF,
R. E. MERIWETHER.